(12) United States Patent
Sekikawa

(10) Patent No.: US 6,837,762 B2
(45) Date of Patent: Jan. 4, 2005

(54) MARINE GAS CYLINDER APPARATUS

(75) Inventor: Shinsuke Sekikawa, Saitama (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/449,354

(22) Filed: May 30, 2003

(65) Prior Publication Data
US 2004/0087227 A1 May 6, 2004

(30) Foreign Application Priority Data

Nov. 6, 2002 (JP) ........................................ 2002-323123

(51) Int. Cl.[7] ................................................ B63H 20/08
(52) U.S. Cl. .................................. 440/61 T; 440/61 G
(58) Field of Search ........................... 440/61 R, 61 T, 440/61 G, 61 H

(56) References Cited

U.S. PATENT DOCUMENTS 6,332,817 B1 * 12/2001 Nakamura ................ 440/61 R
6,454,619 B1 * 9/2002 Funami et al. ............ 440/61 R
6,461,205 B1 * 10/2002 Banba et al. .............. 440/61 R

FOREIGN PATENT DOCUMENTS

JP          HEI781682          3/1995

* cited by examiner

Primary Examiner—Jesus D. Sotelo
(74) Attorney, Agent, or Firm—Orum & Roth

(57) ABSTRACT

In a marine gas cylinder apparatus provided with a switching valve apparatus capable of switching a communication state among a piston rod side oil chamber, a piston side oil chamber and a gas chamber, a relief passage communicating a communication chamber of the switching valve apparatus with the gas chamber is provided. A temperature compensating relief valve relieving an oil in the communication chamber to the gas chamber is provided in the relief passage.

9 Claims, 9 Drawing Sheets

MARINE GAS CYLINDER APPARATUS

BACKGROUND OF THE INVENTION

1. Field of the Invention

The present invention relates to a marine gas cylinder apparatus.

2. Description of the Related Art

Conventionally, as described in Japanese Patent Application Publication No. 7-81682 (patent publication 1), a marine gas cylinder apparatus includes a structure in which a cylinder block is connected to one of either a hull or a propulsion unit. A piston rod inserted into the cylinder block from a rod guide provided in the cylinder block is connected to the corresponding hull or propulsion unit. A piston rod side oil chamber in a side which receives the piston rod and a piston side oil chamber in a side which does not receive the piston rod are provided within the cylinder block. High pressure gas is charged into a portion above a working fluid in the piston rod side oil chamber, and a switching valve apparatus capable of switching a communication state among the piston rod side oil chamber and the piston side oil chamber is provided in the cylinder block. It is possible to manually tilt up and down the propulsion unit easily while obtaining an assist force applying a gas pressure to the piston rod, by communicating the piston rod side oil chamber and the piston side oil chamber, on the basis of an opening operation of the switching valve apparatus.

In the prior art in the patent publication 1, since a gas chamber is provided in an inner portion of the piston rod side oil chamber, it is impossible to lock movement of the piston even by shutting off the communication between the piston rod side oil chamber and the piston side oil chamber on the basis of a closing operation of the switching valve apparatus, so that it is impossible to make the propulsion unit in a tilt-lock state at an optional position.

Accordingly, the applicant of the present invention proposes a switching valve apparatus of a marine gas cylinder apparatus as set out in Japanese Patent Application No. 2002-84246. This switching valve apparatus of the marine gas cylinder apparatus comprises a check valve which is provided in a communication passage communicating a piston rod side oil chamber with a communication chamber and is opened by pressure of the piston rod side oil chamber. A check valve is also provided in a communication passage communicating the piston side oil chamber with the communication chamber which is opened by pressure of the piston side oil chamber, and a check valve provided in a communication passage communicating the gas chamber with the communication chamber and which is opened by pressure of the gas chamber. In accordance with this structure, it is possible to simultaneously open and close all the check valves. It is possible to communicate all the communication passages with each other in the communication chamber by opening all the check valves on the basis of the opening operation. It is possible to easily manually tilt the propulsion unit up and down while obtaining an assist force applying the gas pressure of the gas chamber to the piston rod. Further, it is possible to shut off all the communication passages with respect to the communication chamber by closing all the check valves during a closing operation so as to prevent the influence of the gas chamber from being applied to the piston rod side oil chamber and the piston side oil chamber. It is thereby possible to lock the movement of the piston and it is possible to tilt-lock the propulsion unit at optional positions.

However, in the gas cylinder apparatus mentioned above which the applicant of the present invention proposes, the communication chamber becomes a sealed space by the closing operation of the switching valve apparatus. That is, each of the check valves comprising the switching valve apparatus is operated by a spring force and a pressure difference. It is structured such that if any check valve is opened by the pressure of the communication passage in any of the piston rod side oil chambers, the piston side oil chamber and the gas chamber, the other check valves are closed by the pressure (the back pressure) of the communication chamber, and the opened check valve is again closed, so that the communication chamber forms a sealed space. As described above, since the communication chamber of the switching valve apparatus forms the sealed space, the hydraulic pressure of the communication chamber becomes excessively high at a time when the working fluid in the communication chamber is expanded due to the abnormal temperature increase. Therefore, a heavy load is required for opening the check valve, and there is a risk that the switching valve apparatus becomes broken.

SUMMARY OF THE INVENTION

An object of the present invention is to make it possible to easily move a propulsion unit up and down and reduce a switching force of a switching valve apparatus while making it possible to lock the propulsion unit at optional positions, thereby achieving temperature compensation.

The present invention relates to a marine gas cylinder apparatus structured such that a cylinder block is connected to either a hull or a propulsion unit. A piston rod inserted into the cylinder block from a rod guide provided in the cylinder block is connected to the corresponding hull or the propulsion unit. A piston rod side oil chamber in a side of which receives the piston rod and a piston side oil chamber in a side which does not receive the piston rod are provided within the cylinder block. A gas chamber which communicates with the piston rod side oil chamber and the piston side oil chamber is integrally formed in the cylinder block. A switching valve apparatus capable of switching a communication state among the piston rod side oil chamber, the piston side oil chamber and the gas chamber is provided in the cylinder block.

The switching valve apparatus has a check valve provided in a communication passage communicating the piston rod side oil chamber with the communication chamber and opened by pressure of the piston rod side oil chamber. A furhter check valve is provided in a communication passage communicating the piston side oil chamber with the communication chamber and is opened by pressure of the piston side oil chamber. Another check valve is provided in a communication passage communicating the gas chamber with the communication chamber and is opened by pressure of the gas chamber.

The switching valve apparatus opens and closes all the check valves at one time. It opens all the check valves in accordance with an opening operation, whereby all the communication passages are communicated with each other in the communication chamber, and closes all the check valves in accordance with a closing operation. All the communication passages are thereby shut off with respect to the communication chamber.

A relief passage communicating the communication chamber of the switching valve apparatus with the gas chamber is provided. A temperature compensating relief valve relieving the oil in the communication chamber to the gas chamber is provided in the relief passage.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 9A and 9B show a valve guide and a pin of a rotation body, in which FIG. 9A is a plan view and FIG. 9B is a front elevational view.

DESCRIPTION OF THE PREFERRED EMBODIMENTS

Figure 1:
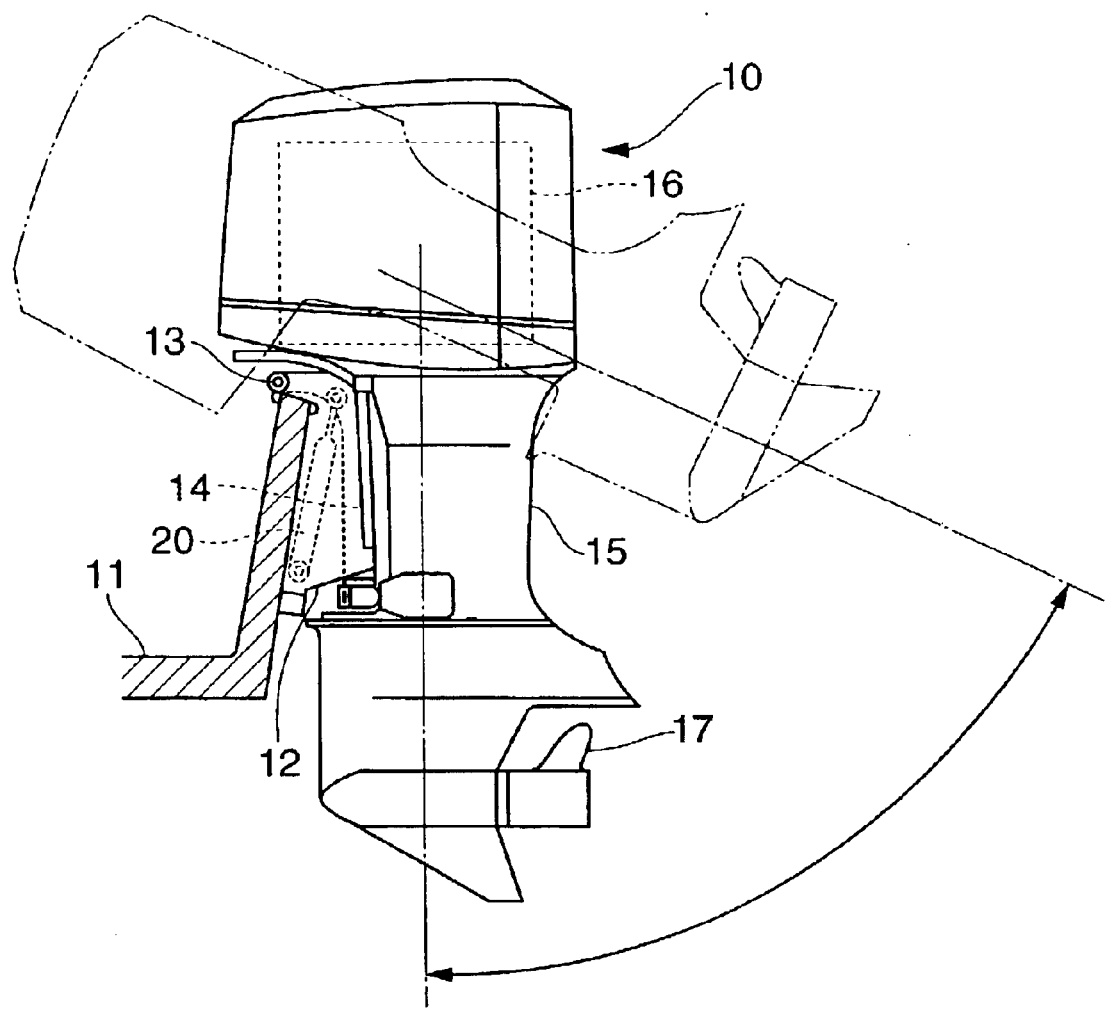
FIG. 1 is a schematic view showing a marine propulsion unit.

A marine propulsion unit, for example an outboard motor, an inboard-outdrive motor, or other type is shown in FIG. 1 as an embodiment 10. Clamp bracket 12 is fixed to a hull 11. A swivel bracket 14 is pivoted to the clamp bracket 12 via a tilt shaft 13 so as to be capable of tilting around an approximately horizontal axis. A propulsion unit 15 is pivoted to the swivel bracket 14 via a rudder turning axis (not shown) so as to be capable of rotating around an approximately vertical axis. The propulsion unit 15 drives a propeller 17 by an engine unit 16.

Figure 2:
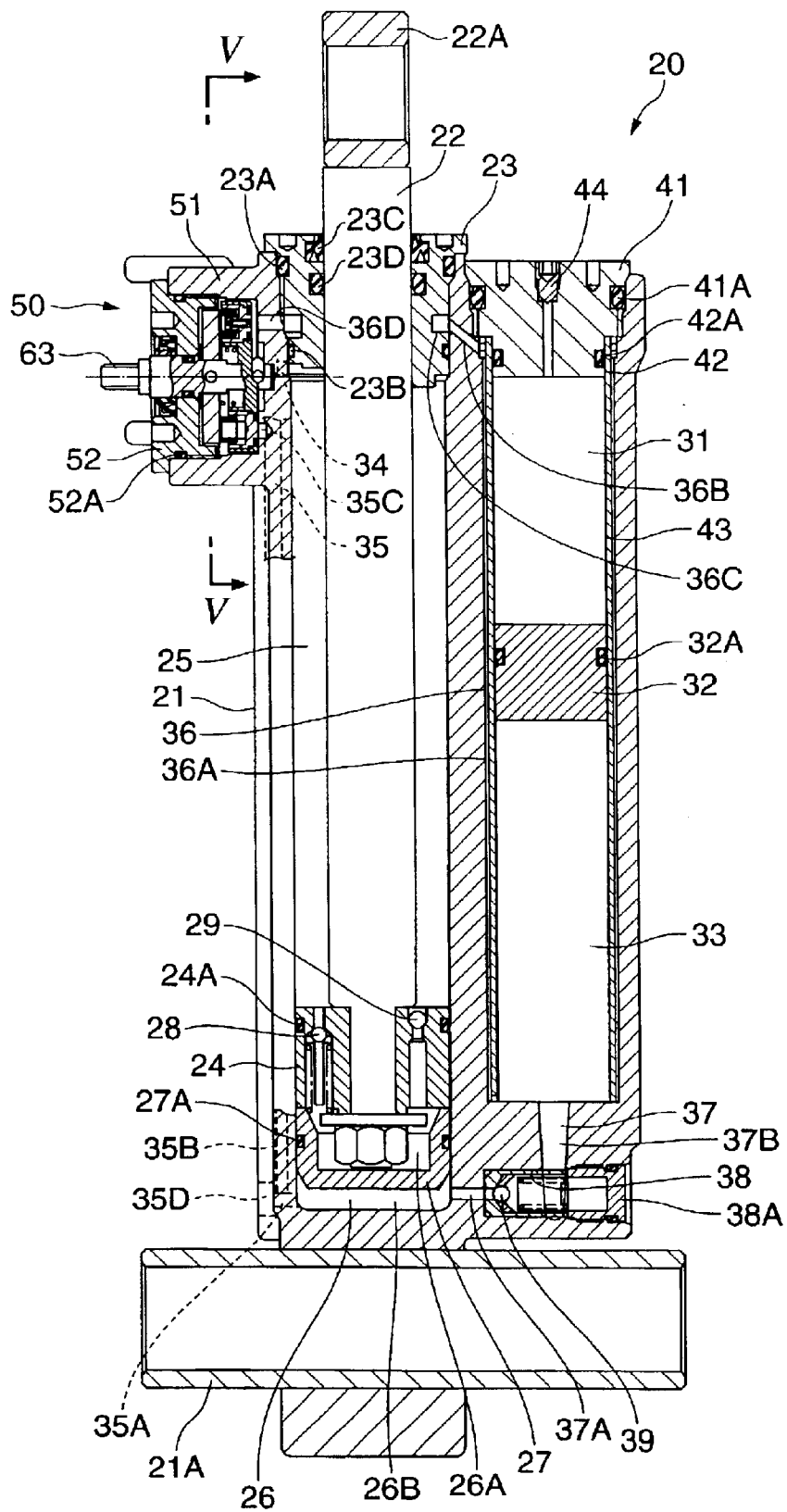
FIG. 2 is a cross sectional view showing a gas cylinder apparatus.
Figure 3:
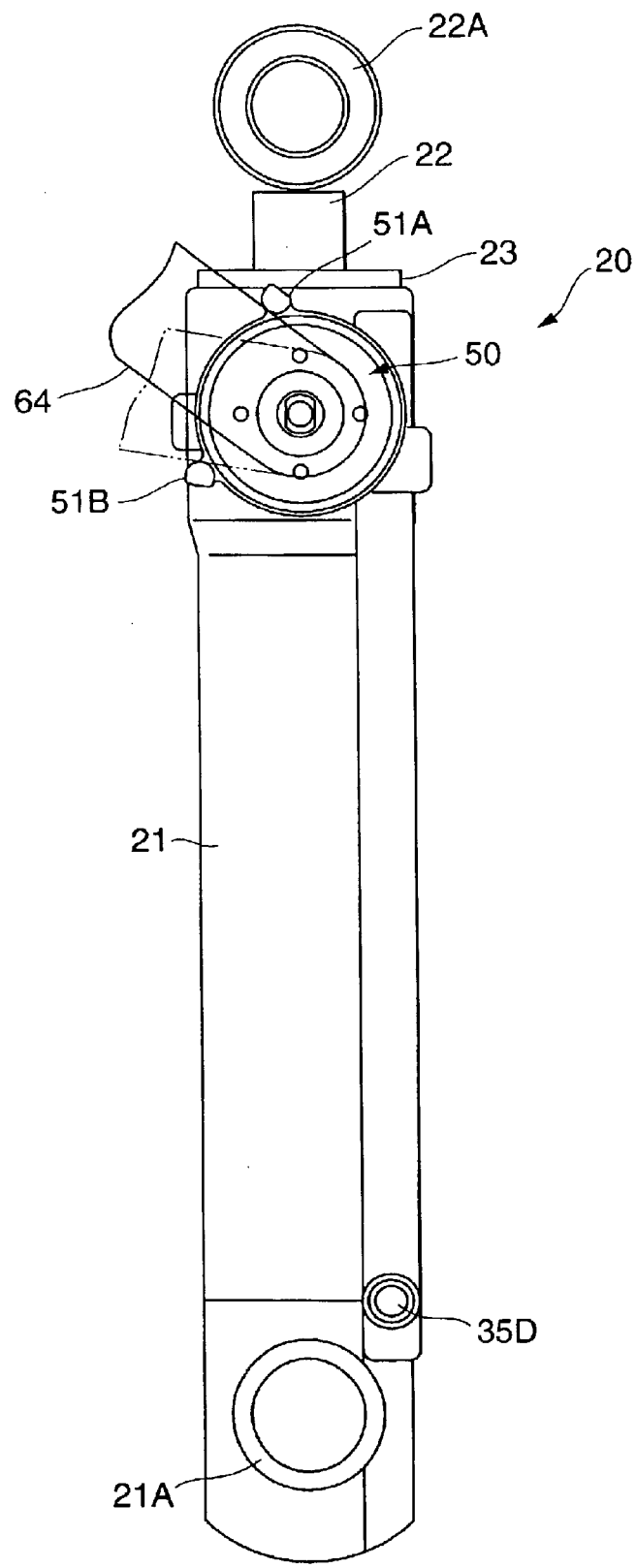
FIG. 3 is a side elevational view of FIG. 2.
Figure 4:
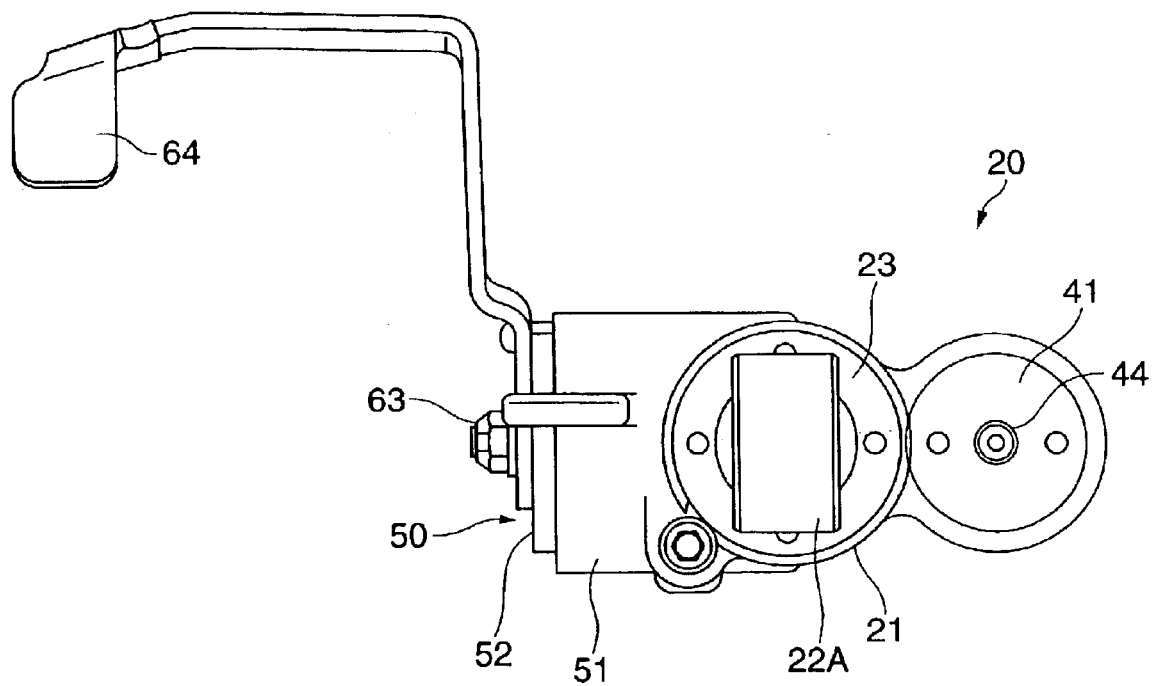
FIG. 4 is a plan view of FIG. 2.
Figure 5:
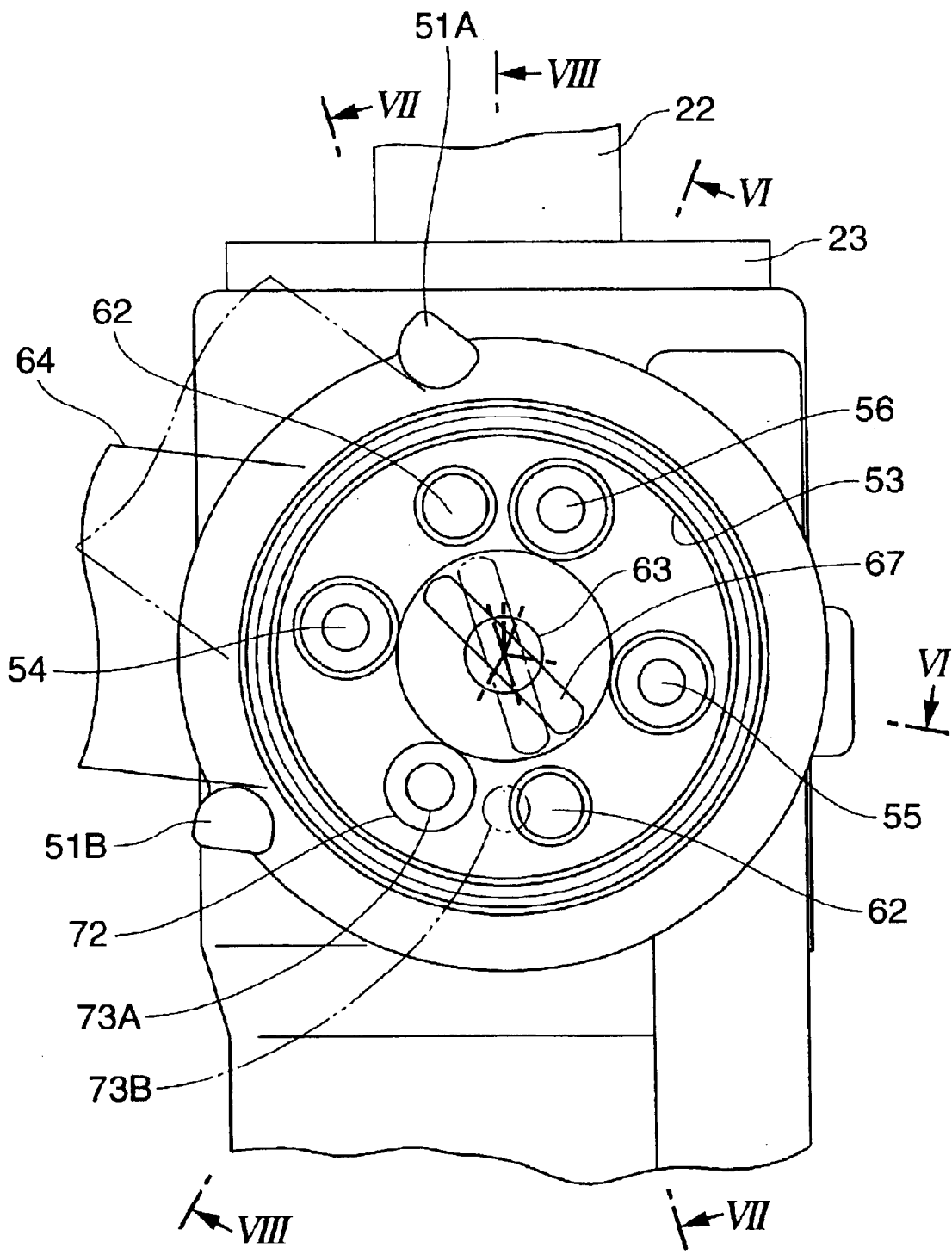
FIG. 5 is a view along a line V—V in FIG. 2.

The marine propulsion unit 10 is provided with a gas cylinder apparatus 20 between the clamp bracket 12 and the swivel bracket 14. The gas cylinder apparatus 20 has a cylinder block 21 casted of an aluminum alloy or the like, and a piston rod 22, as shown in FIGS. 2 to 4. The piston rod 22 is inserted in a liquid tight manner from a rod guide 23 which is screwed in a liquid tight manner with the cylinder block 21 via O-rings 23A and 23B, into the cylinder block 21 via an oil seal 23C and O-rings 23D. A mounting portion 21A provided in a lower end portion of the cylinder block 21 is connected to the clamp bracket 12, and a mounting portion 22A provided in an upper end portion of the piston rod 22 is connected to the swivel bracket 14.

The gas cylinder apparatus 20 is structured such that a piston 24 having an O-ring 24A is fixed to an insertion end of the piston rod 22 inserted to the cylinder block 21. A piston rod side oil chamber 25 receiving the piston rod 22 and a piston side oil chamber 26 receiving no piston rod 22 are provided in an inner portion of the cylinder block 21, and a working fluid is received in the piston rod side oil chamber 25 and the piston side oil chamber 26. In this case, the piston side oil chamber 26 receives a free piston 27 with an O-ring 27A arranged close to the piston 24. The free piston 27 sections the piston side oil chamber 26 into an upper piston side oil chamber 26A and a lower piston side oil chamber 26B.

The piston 24 is provided with an absorber valve 28 and a return valve 29 respectively in two flow passages communicating between the piston rod side oil chamber 25 and the piston side oil chamber 26A. The absorber valve 28 is opened when pressure within the piston rod side oil chamber 25 is abnormally increased, such as under an impact force application caused by collision with an obstacle, and the increased pressure reaches a predetermined pressure value, the oil within the piston rod side oil chamber 25 is fed to the upper piston side oil chamber 26A. The return valve 29 can be opened when pressure within the upper piston side oil chamber 26A reaches a predetermined pressure value under an application of empty weight of the tilted-up propulsion unit 15, after absorbing the impact force caused by the collision against the obstacle.

The gas cylinder apparatus 20 is structured such that a gas chamber 31 communicates with the piston rod side oil chamber 25 and the piston side oil chamber 26 is integrally formed in a side of one side of the upper portion of the cylinder block 21. The gas chamber 31 may be provided with a lower oil chamber 33 via a free piston 32 with an O-ring 32A.

The gas cylinder apparatus 20 is provided with a switching valve apparatus 50 capable of switching the communication state among the piston rod side oil chamber 25, the piston side oil chamber 26 and the gas chamber 31, and therefore the lower oil chamber 33, in the cylinder block 21. The switching valve apparatus 50 is provided in a side of an opposite side to the gas chamber 31, and therefore the lower oil chamber 33, in the upper portion of the cylinder block 21.

The gas cylinder apparatus 20 has a communication passage 34 communicating the piston rod side oil chamber 25 with the switching valve apparatus 50. A communication passage 35 communicates the piston side oil chamber 26 with the switching valve apparatus 50, and a communication passage 36 communicates the gas chamber 31 with the switching valve apparatus 50. The switching valve apparatus 50 is switched and may be set to any off mode in which all the communication passages 34, 35 and 36 are shut off with each other, or an on mode in which all the communication passages 34, 35 and 36 are communicated with each other.

When the switching valve apparatus 50 is set to the off mode, the gas cylinder apparatus 20 shuts off the communication among the piston rod side oil chamber 25, the piston side oil chamber 26 and the gas chamber 31, and therefore the lower oil chamber 33 so as to stop a telescopic motion of the piston rod 22. This allows the propulsion unit 15 to be in a tilt-lock state at all the positions without being affected by the gas chamber 31. In the off mode of the switching valve apparatus 50, even when the propulsion unit 15 collides with an obstacle and the piston rod 22 and the piston 24 are temporarily expanded, no oil of the lower oil chamber 33 in the gas chamber 31 is supplied to the lower piston side oil chamber 26B in the lower side of the free piston 27. The stop position of the free piston 27 is therefore not displaced before or after the collision. An amount of oil flowing into the upper piston side oil chamber 26A from the piston rod side oil chamber 25 via the absorber valve 28 becomes the same as the amount of oil returned to the piston rod side oil chamber 25 from the upper piston side oil chamber 26A via the return valve 29. Accordingly, it is possible to securely coincide the return position after absorbing the impact of the piston rod 22 against the cylinder block 21 with the stop position before absorbing the impact.

When the switching valve apparatus 50 is set to the on mode, the gas cylinder apparatus 20 communicates the piston rod side oil chamber 25, the piston side oil chamber 26, the gas chamber 31, and therefore the lower oil chamber 33 with each other so as to make it possible to expand the piston rod 22. This makes it possible to manually tilt the propulsion unit 15 up and down. In the on mode of the switching valve apparatus 50, the gas pressure of the gas chamber 31 applies an assist force to the piston rod 22, and reduces the operating force for manually tilting up and down. Further, in the on mode of the switching valve apparatus 50, the oil in an amount corresponding to a volumetric capacity of the piston rod 22 draining from the piston rod side oil chamber 25 and the piston side oil chamber 26 is supplied to the piston side oil chamber 26 from the lower oil chamber 33 of the gas chamber 31 in the tilt-up stroke of the gas cylinder apparatus 20. The oil in an amount corresponding to a volumetric capacity of the piston rod 22 moving forward to the piston rod side oil chamber 25 and the piston side oil chamber 26 is supplied to the lower oil chamber 33 from the piston side oil chamber 26 in the tilt-down stroke of the gas cylinder apparatus 20.

In this case, the gas cylinder apparatus 20 is provided with a temperature compensating relief valve 39 in a valve insertion portion 38 arranged in a middle portion of a communication passage 37 communicating between the piston side oil chamber 26 and the lower oil chamber 33 of the gas chamber 31. When the temperature of the working fluid in the piston rod side oil chamber 25 and the piston side oil chamber 26 is abnormally increased in the off-mode of the switching valve apparatus 50, the oil in the piston side oil chamber 26 is relieved from the relief valve 39 to the lower oil chamber 33.

The gas cylinder apparatus 20 is made as follows in (A) an arrangement of the communication passages 34 to 37 provided in the cylinder block 21, and (B) a structure of the switching valve apparatus 50.

(A) Arrangement of Communication Passages 34 to 37 in Cylinder Block 21 (FIGS. 2 to 4 and 6)

The communication passage 34 is a transverse hole provided in the cylinder block 21, and is open to an upper end portion of the piston rod side oil chamber 25. The communication passage 34 is a short hole and is drilled in the cylinder block 21 after being casted.

The communication passage 35 is constituted by a transverse hole 35A, a vertical hole 35B and a transverse hole 35C which are provided in the cylinder block 21. The transverse hole 35A open to a lower end portion of the piston side oil chamber 26, and the transverse hole 35C open to the switching valve apparatus 50 are relatively short holes, and are formed in the cylinder block 21 after being casted, by drilling. The transverse hole 35A is sealed by a plug 35D. The vertical hole 35B is a relatively long hole connecting the transverse hole 35A to the transverse hole 35C, and is formed after casting the cylinder block 21. The vertical hole 35B may be formed by casting a pipe during casting.

The communication passage 36 is formed by using the cylinder block 21 and the rod guide 23. At this time, the gas cylinder apparatus 20 is structured such that an upper end inner peripheral portion of a pipe 43 constituted by a drawn tube is fitted in a liquid tight manner via an O-ring 42A to a lower end small diameter portion 42 of a cap 41 screwed in a liquid tight manner with the cylinder block 21 via an O-ring 41A. The pipe 43 is inserted to the cylinder block 21, and the gas chamber 31. The free piston 32 and the lower oil chamber 33 mentioned above are provided in an inner portion of the pipe 43. Reference numeral 44 denotes a gas charged portion.

Further, the communication passage 36 is constituted by an annular hole 36A provided in an annular hollow portion between the cylinder block 21 and the pipe 43, an oblique hole 36B provided in the cylinder block 21, an annular groove 36C provided in the rod guide 23, and a transverse hole 36D provided in the cylinder block 21. The annular hole 36A is a relatively long hole, and is communicated with the lower oil chamber 33 from a lower end notch portion of the pipe 43. Alternatively, the annular hole 36A may be communicated with the lower oil chamber 33 by a groove provided the bottom of the communication passage 36. The oblique hole 36B is a relatively short hole connecting an upper end portion of the annular hole 36A to the annular groove 36C, and is drilled in the cylinder block 21 after being casted. The annular groove 36C is cut on an outer periphery of the rod guide 23. The transverse hole 36D is a relatively short hole connecting the annular groove 36C to the switching valve apparatus 50, and is drilled in the cylinder block 21 after being casted.

The communication passage 37 is constituted by a transverse hole 37A and a vertical hole 37B which are provided in the cylinder block 21. The transverse hole 37A is a relatively short hole connecting the piston side oil chamber 26 to the valve insertion portion 38, and is drilled in the cylinder block 21 after being casted. The valve insertion portion 38 is sealed by a plug 38A. The vertical hole 37B is a relatively short hole connecting the valve insertion portion 38 to the lower oil chamber 33, and may be formed at a time of casting the cylinder block 21, or may be drilled in the cylinder block 21 after being casted.

Accordingly, in the gas cylinder apparatus 20, the relatively long hole formed when casting the cylinder block 21 is only the vertical passage 35B of the communication passage 35. Further, since the gas chamber 31 is formed by the pipe 43 of the drawn tube, the free piston 32 can be received without working the pipe 43.

(B) Structure of Switching Valve Apparatus 50 (FIGS. 5 to 9)

The switching valve apparatus 50 has a valve case 51 integrally formed in a side portion of an opposite side to the gas chamber 31 as mentioned above, in the upper portion of the cylinder block 21. The apparatus is provided with a cap 52 which cooperates in a liquid tight manner in the valve case 51 via an O-ring 52A by screwing, and forms a communication chamber 53 in an inner space of the valve case 51.

Figure 10:
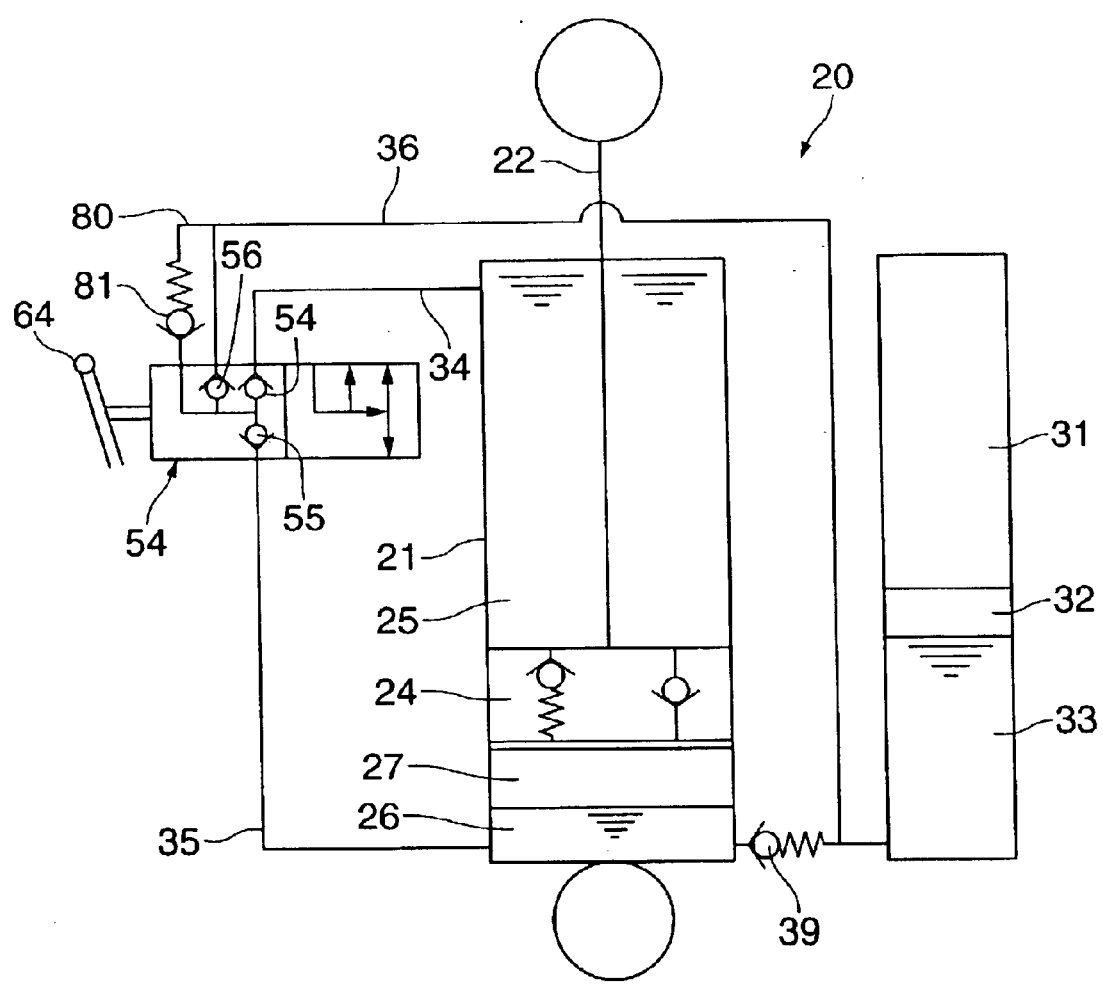
FIG. 10 is a hydraulic circuit diagram of a gas cylinder apparatus.

The switching valve apparatus 50 is a three-way valve as shown in FIG. 10. A seat surface 53A to which ports A, B and C of the respective communication passages 34, 35 and 36 are open is formed in the communication chamber 53 provided in the valve case 51. The switching valve apparatus 50 is provided with a poppet valve 54 provided in the port A of the communication passage 34 communicating the piston rod side oil chamber 25 with the communication chamber 53 and is opened by pressure of the piston rod side oil chamber 25. A poppet valve 55 is provided in the port B of the communication passage 35 communicating the piston side oil chamber 26 with the communication chamber 53 and is opened by pressure of the piston side oil chamber 26. A poppet valve 56 is provided in the port C of the communication passage 36 communicating the gas chamber 31, and therefore the lower oil chamber 33 with the communication chamber 53, and is opened by pressure of the gas chamber 31, and therefore the lower oil chamber 33.

The switching valve apparatus 50 receives a valve guide 61 in the communication chamber 53 of the valve case 51. The switching valve fits the valve guide 61 to two parallel pins 62 provided at two positions in a diametrical direction of the communication chamber 53, makes the valve guide 61 capable of linearly reciprocating in a rotation preventing state, and makes the valve guide 61 capable of moving close to or apart from the seat surface 53A.

The switching valve apparatus 50 is provided with the poppet valves 54 to 56 in three guide holes provided in the valve guide 61 respectively so as to move linearly. The respective poppet valves 54 to 56 constitute the check valves of the present invention. When a valve body 58 energized by a valve spring 57 backed up by the rotation plate 65 mentioned below collides and aligns with opening edges of the guide holes of the valve guide 61, the poppet valves 54 to 56 protrude seal members 58A provided in an outer end surface of the valve body 58 from the opening edges of the guide holes, and cause the protruding seal member 58A to seat on the corresponding ports A to C of the seat surface 53A. This allows for a state in which the valve guide 61 is in the position close to the seat surface 53A.

In this case, the switching valve apparatus 50 can open and close all the poppet valves 54 to 56 provided in the valve guide 61 simultaneously, in the present embodiment, by operating the valve guide 61 so as to move the valve guide 61 close to or apart from the seat surface 53A. The ports A to C of all the communication passages 34 to 36 can be communicated with each other in the communication chamber 53 by opening all the poppet valves 54 to 56 in accordance with the opening operation. The ports A to C of all the communication passages 34 to 36 can be shut off with respect to the communication chamber 53 by closing all the poppet valves 54 to 56 in accordance with the closing operation.

Accordingly, the switching valve apparatus 50 is structured such that a rotation shaft 63 supported by the valve case 51 is inserted in a liquid tight manner to the cap 52 via a dust seal 52B and an O-ring 63A. A rotation operating lever 64 is provided in an outer end portion of the rotation shaft 63. An inner end portion of the rotation shaft 63 is pivoted to a bearing recess portion provided in the seat surface 53A, and the rotation plate 65 is integrally formed in a middle portion of the rotation shaft 63 via a spring pin 63B.

The switching valve apparatus 50 is provided with a spring 66 energizing the valve guide 61 in a direction moving the valve guide 61 close to the seat surface 53A, between an outer flange of the valve guide 61 and the rotation plate 65. Further, a pin 67 (a protrusion body) contacted with an end surface of the valve guide 61 is provided in a middle portion passing through the valve guide 61 of the rotation shaft 63. A recess-shaped pin sinking portion 68 having a taper surface is provided in one side extending in a direction crossing to a center axis of the rotation shaft 63 in the end surface of the valve guide 61. The pin 67 is provided in a center portion which is not interfered with the guide hole provided with the poppet valves 54 to 56, and the parallel pin 62, in the end surface of the valve guide 61.

The switching valve apparatus 50 has a click ball 72 which is backed up in a part of a peripheral direction on an end surface opposing to the rotation plate 65 of the valve guide 61 by a click spring 71. A closed position corresponding hole 73A and an open position corresponding hole 73B are provided in two positions which are apart from each other in a peripheral direction of a flat surface of the rotation plate 65. The rotation operating lever 64 is rotated until being collided and aligned with the closed side stopper 51A of the valve case 51 (FIG. 3). When the closed position corresponding hole 73A of the rotation plate 65 is engaged with the click ball 72 of the valve guide 61, the rotation plate 65 is set to a closing operation position making the valve guide 61 move close to the seat surface 53A shown in a lower part of FIG. 8. The rotation operating lever 64 is rotated until being collided and aligned with the open side stopper 51B of the valve case 51 (FIG. 3). When the open position corresponding hole 73B of the rotation plate 65 is engaged with the click ball 72 of the valve guide 61, the rotation plate 65 is set to an opening operation position making the valve guide 61 move apart from the seat surface 53A, shown in an upper part of FIG. 8.

Accordingly, the switching valve apparatus 50 rotates the rotation plate 65 and the pin 67 integrally formed with the rotation shaft 63 by the rotation operating lever 64. (a) When positioning the rotation plate 65 and the pin 67 at the closing operation position by engaging the close position corresponding hole 73A of the rotation plate 65 with the click ball 72 of the valve guide 61, the pin sinking portion 68 of the valve guide 61 falls in the pin 67. This makes the valve guide 61 move close to the seat surface 53A due to a spring force of the spring 66. Each of the poppet valves 54 to 56 is seated on the corresponding ports A to C of the seat surface 53A so as to close the ports A to C, whereby the off mode mentioned above shutting off all the communication passages 34 to 36 is set, shown in lower part of FIGS. 6 to 9.

Alternatively, the switching valve apparatus 50 rotates the rotation plate 65 and the pin 67 integrally formed with the rotation shaft 63 by the rotation operating lever 64. (b) When positioning the rotation plate 65 and the pin 67 at the opening operation position by engaging the open position corresponding hole 73B of the rotation plate 65 with the click ball 72 of the valve guide 61, the pin 67 lifts up a flat surface of the valve guide 61 and makes the valve guide 61 move apart from the seat surface 53A against the spring force of the spring 66. This releases each of the poppet valves 54 to 56 from the corresponding ports A to C of the seat surface 53A so as to connect the ports A to C with the communication chamber 53. The on mode mentioned above communicating all the communication passages 34 to 36 with each other is set, shown in an upper part of FIGS. 6 to 9.

In this case, when the switching valve apparatus 50 is in the closing operation position; the off mode, in the item (a) mentioned above, when any one of the piston rod side oil chamber 25, the piston side oil chamber 26 and the gas chamber 31 reaches high pressure, one of the poppet valves 54 to 56 seating on the ports A to C of the corresponding communication passages 34 to 36 is opened so as to apply the high pressure fluid to the communication chamber 53. This high pressure fluid applies a checking effect to the other two poppet valves 54 to 56 in the communication chamber 53 to keep closing these two poppet valves 54 to 56. Accordingly, it is possible to stably maintain the shut-off state of the poppet valves 54 to 56.

Further, the rotation plate 65 is connected to the rotation shaft 63 by the spring pin 63B in the manner mentioned above to prevent the rotation shaft 63 from coming off, and forms a cover of the poppet valves 54 to 56 received in the respective guide holes of the valve guide 61. The valve spring 57 provided in each of the poppet valves 54 to 56 is structured such as to improve response of the valve body 58, however, it may be omitted. When arranging the valve spring 57 in each of the poppet valves 54 to 56, a thrust washer or a spring guide is interposed between the rotation plate 65 and the valve spring 57. It is possible to prevent the rotation plate 65 and the valve spring 57 from being frictionally displaced and it is possible to prevent abrasion powders from being generated.

Accordingly, in the gas cylinder apparatus 20, the following structure is provided for the purpose of reducing the force for switching the switching valve apparatus 50.

In this case, in the gas cylinder apparatus 20, there is provided a relief passage 80 communicating the communication chamber 53 of the switching valve apparatus 50 with the gas chamber 31, and therefore the lower oil chamber 33. The relief passage 80 is provided with a temperature compensating relief valve 81 relieving the oil in the communication chamber 53 to the lower oil chamber 33 of the gas chamber 31 via the communication passage 36, in the present embodiment.

Figure 6:
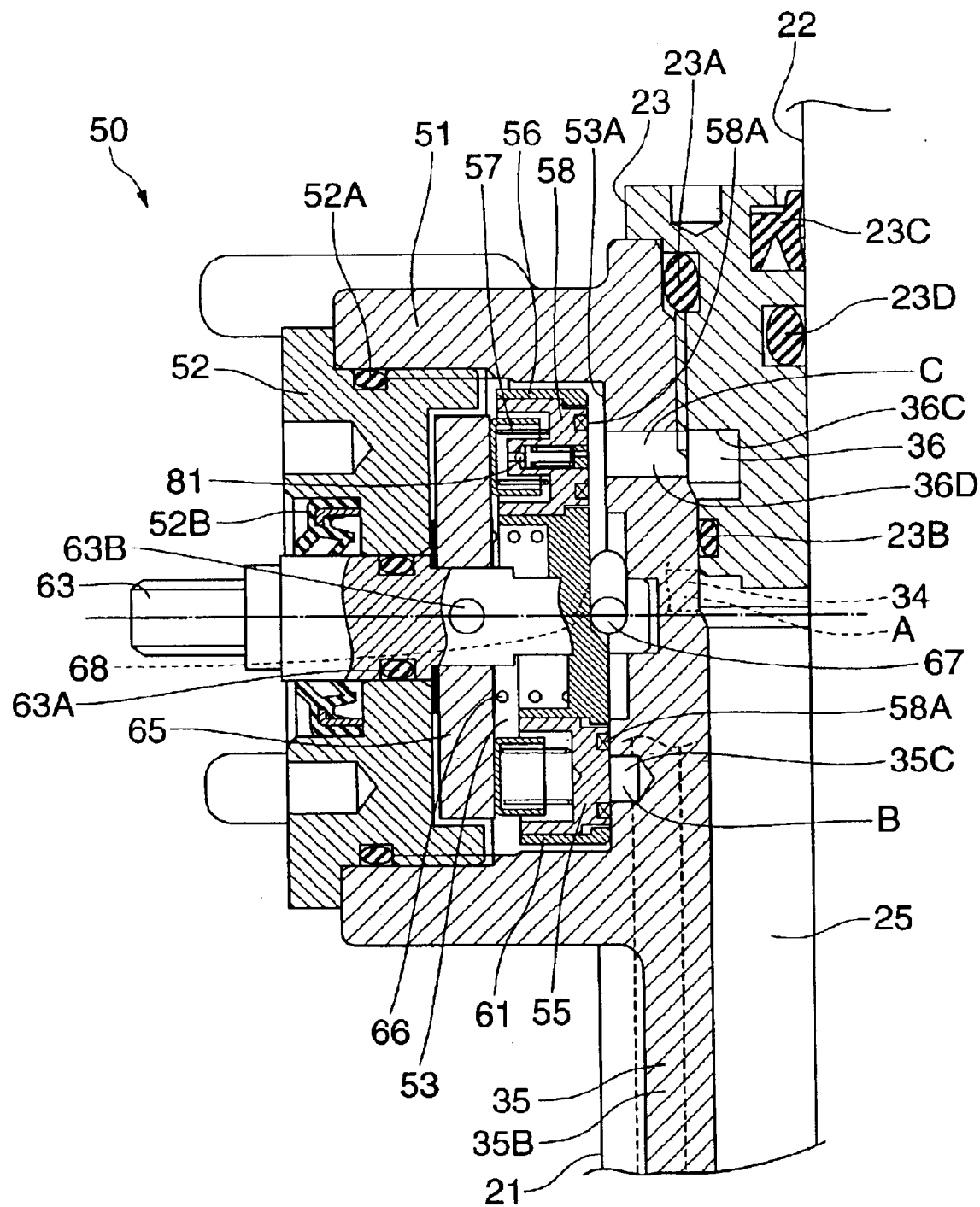
FIG. 6 is a cross sectional view along a line VI—VI in FIG. 5.

The relief valve 81 can be arranged in the poppet valve 56 provided in the communication passage 36 communicating the communication chamber 53 with the gas chamber 31, as shown in FIG. 6. The relief valve 81 is structured to form a valve chamber provided with a passage communicated with each of the communication chamber 53 and the communication passage 36 (36D) in the poppet valve 56, and to receive a ball valve and a spring pressure contacting the ball valve with a valve seat in the valve chamber.

Figure 7:
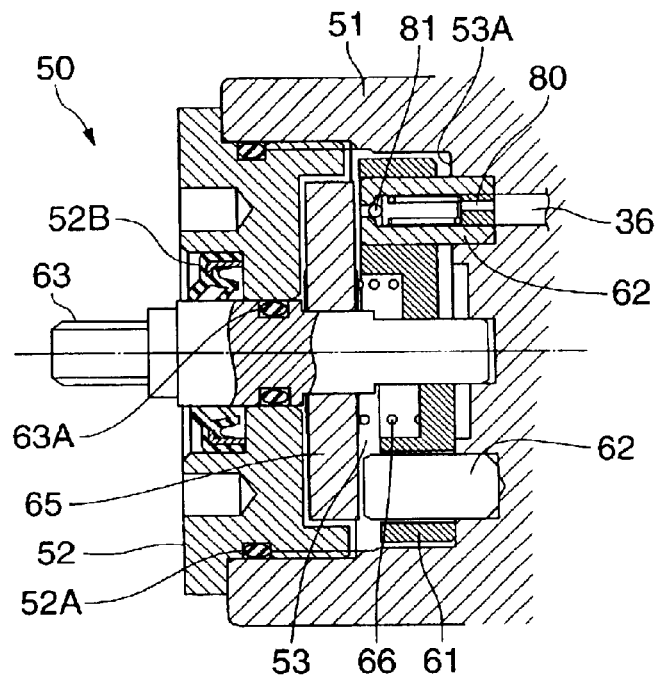
FIG. 7 is a cross sectional view along a line VII—VII in FIG. 5.
Figure 8:
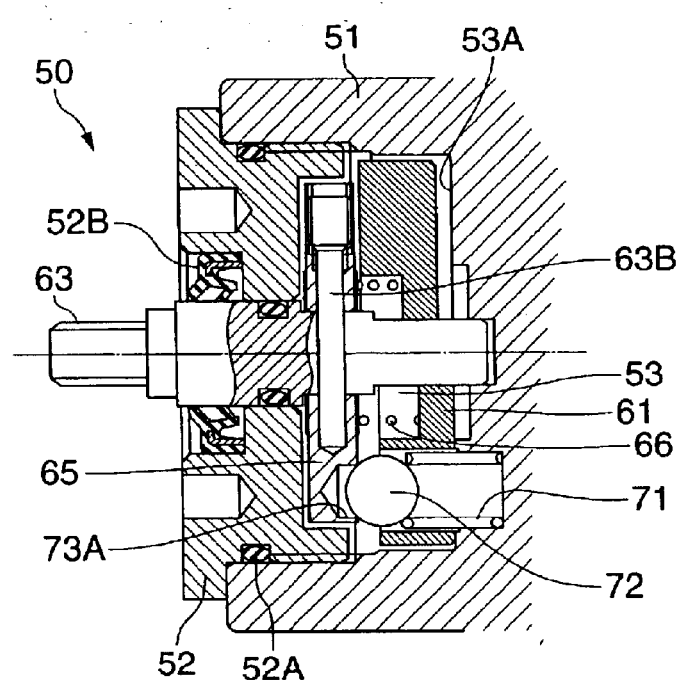
FIG. 8 is a cross sectional view along a line VIII—VIII in FIG. 5.
Figure 9A:
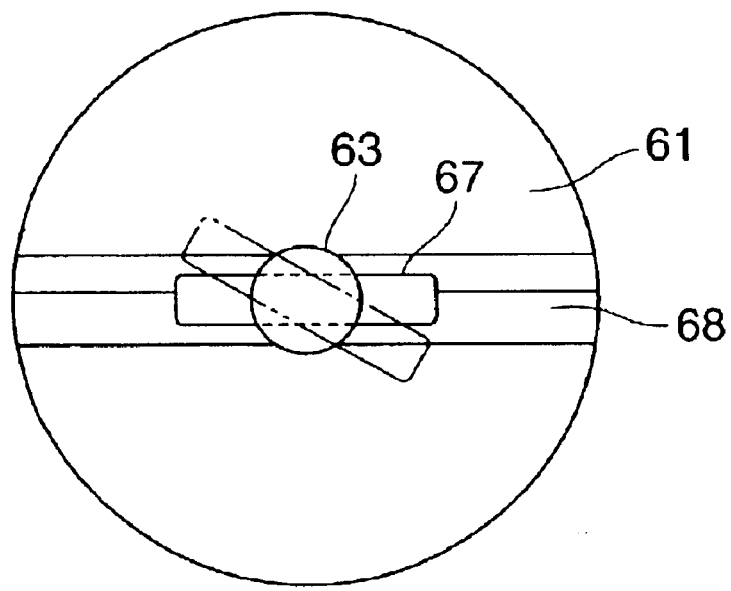
Figure 9B:
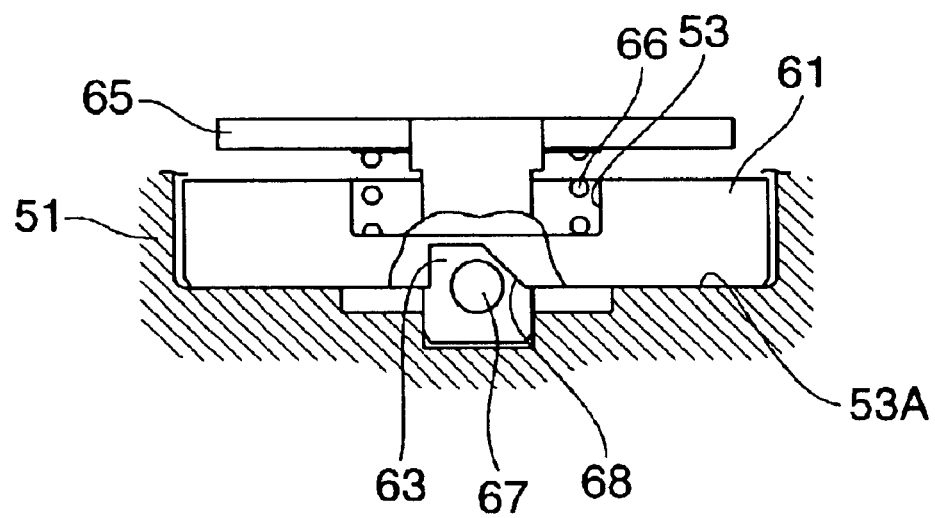

The relief valve 81 is not limited to the structure arranged in the poppet valve 56 as shown in FIG. 7, but may be arranged in the parallel pin 62 for the valve guide 61. The relief valve 81 is structured to form a valve chamber provided with a passage communicated with each of the communication chamber 53 and the communication passage 36 in the parallel pin 62, and to receive a ball valve and a spring pressure contacting the ball valve with a valve seat in the valve chamber.

In this case, in the gas cylinder apparatus 20, the temperature compensating relief valve 81 is provided between the communication chamber 53 and the gas chamber 31, and therefore the lower oil chamber 33. The temperature compensating relief valve 39 is also provided between the piston side oil chamber 26 and the gas chamber 31, and therefore the lower oil chamber 33. Whereby both the relief valve 39 and the relief valve 81 are communicated with the gas chamber 31, and therefore the lower oil chamber 33. It is necessary to set the valve opening pressures of the relief valve 39 and the relief valve 81 to be the same, or to make the valve opening pressure of the relief valve 81 greater. Further, the gas cylinder apparatus 20 may be provided only with the relief valve 81, and the relief valve 81 can double-function as the function of relief valve 39.

Therefore, in accordance with the present embodiment, the following effects can be obtained.

(1) When the hydraulic pressure of the working fluid in the communication chamber 53 of the switching valve apparatus 50 becomes excessively high due to the temperature increase, the hydraulic pressure is relieved to the gas chamber 31, and therefore the lower oil chamber 33, on the basis of the opening operation of the relief valve 81 provided in the relief passage 80. Accordingly, even when the hydraulic pressure in the communication chamber 53 becomes excessively high, the force for switching or opening the switching valve apparatus 50 is reduced, and there is no risk of damage to the switching valve apparatus 50.

The pressure of the communication chamber 53 is relieved to the gas chamber 31, and therefore the lower oil chamber 33, on the basis of the opening operation of the relief valve 81. It is not relieved to the oil chambers 25 and 26 within the cylinder because of the following reasons. That is, there is a possibility that a high pressure condition remains in the oil chambers 25 and 26 within the cylinder due to an influence of the propulsion unit 15. There is a possibility that the relief pressure becomes higher than the set pressure. Accordingly, if the pressure of the communication chamber 53 is relieved to the oil chambers 25 and 26 within the cylinder, the piston rod 22 is moved, and this matter is not preferable. On the contrary, since the pressure in the gas chamber 31, and therefore the lower oil chamber 33, which is not affected by the propulsion unit 15 is stable, the piston rod 22 is not moved. It is preferable to relieve to the gas chamber 31, and therefore the lower oil chamber 33. The oil chambers 25 and 26 within the cylinder form a sealed space and can not absorb a surplus oil amount. The surplus oil amount is relieved to the gas chamber 31, and therefore the lower oil chamber 33, which is capable of absorbing the surplus oil amount.

(2) Since the relief valve 81 is arranged in the poppet valve 56 provided in the communication passage 36 with the gas chamber 31, and therefore the lower oil chamber 33 of the switching valve apparatus 50, it is possible to make the structure compact with no independent space for arranging the relief valve 81.

(3) Since the relief valve 81 is arranged in the parallel pin 62 for the valve guide 61 of the switching valve apparatus 50, it is possible to make the structure compact with no independent space for arranging the relief valve 81.

(4) Since the relief valve 81 in the items (1) to (3) mentioned above doubles as the temperature compensating relief valve 39 for relieving the oil in the piston rod side oil chamber 25 and the piston side oil chamber 26 to the gas chamber 31, and therefore the lower oil chamber 33, it is possible to commonly use the relief valve 81. It is possible to make the structure compact.

As heretofore explained, embodiments of the present invention have been described in detail with reference to the drawings. However, the specific configurations of the present invention are not limited to the illustrated embodiments but those having a modification of the design within the range of the present claimed invention are also included in the present invention. For example, in carrying out the present invention, the check valve is not limited to the poppet valve.

In accordance with the present invention, in a marine gas cylinder apparatus, it is possible to easily move the propulsion unit up and down and reduce a switching force of a switching valve apparatus while making it possible to lock the propulsion unit at optional positions. This thereby achieves temperature compensation.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A marine gas cylinder apparatus, comprising: a cylinder block connectable to one of a hull and a propulsion unit, a piston rod insertable into the cylinder block from a rod guide provided in the cylinder block and connectable to the other of the hull and the propulsion unit, a piston rod side oil chamber disposed in a side receiving the piston rod and a piston side oil chamber disposed in a side not receiving the piston rod being provided within the cylinder block, a gas chamber in communication with the piston rod side oil chamber and the piston side oil chamber being integrally formed in the cylinder block, a switching valve apparatus capable of switching a communication state among the piston rod side oil chamber, the piston side oil chamber and the gas chamber provided in the cylinder block, the switching valve apparatus having a check valve provided in a communication passage communicating the piston rod side oil chamber with a communication chamber and opened by pressure of the piston rod side oil chamber, a check valve provided in a communication passage communicating the piston side oil chamber with the communication chamber and opened by pressure of the piston side oil chamber, and a check valve provided in a communication passage communicating the gas chamber with the communication chamber and openable by pressure of the gas chamber, the switching valve apparatus being arranged and constructed to open and close all the check valves at one time, to open all the check valves in accordance with an opening operation, whereby all the communication passages are communicated with each other in the communication chamber, to close all the check valves in accordance with a closing operation, whereby all the communication passages are shut off with respect to the communication chamber, and wherein a relief passage communicating the communication chamber of the switching valve apparatus with the gas chamber is provided, and a temperature compensating relief valve relieving the oil in the communication chamber to the gas chamber is disposed in the relief passage.

2. The marine gas cylinder apparatus according to claim 1, wherein the relief valve is arranged in the check valve provided in the communication passage communicated with the gas chamber.

3. The marine gas cylinder apparatus according to claim 1, wherein the switching valve apparatus is structured such that a seat surface to which the port of each of the communication passages opens is formed in the communication chamber provided in a valve case, a valve guide movable close to or apart from the seat surface is received in the communication chamber, each of the check valves is provided in the valve guide, a rotation body supported by the valve case is provided so as to be rotatable, each of the check valves being seated on the corresponding port of the seat surface such that the valve guide is movable close to the seat surface in accordance with the rotating operation of the rotation body, and each of the check valves is releasable from the corresponding port of the seat surface when the valve guide is released from the seat surface, wherein the relief valve is arranged in a parallel pin which is disposed in the communication chamber arranged in the valve case and is fitted so as to be linearly reciprocated in a direction moving close to or apart from the seat surface in a state in which the valve guide is prevented from rotating.

4. The marine gas cylinder apparatus according to claim 1, wherein the relief valve is arranged and constructed to double as a temperature compensating relief valve relieving the oil in the piston rod side oil chamber and the piston side oil chamber to the gas chamber.

5. The marine gas cylinder apparatus according to claim 2, wherein the relief valve is arranged and constructed to double as a temperature compensating relief valve relieving the oil in the piston rod side oil chamber and the piston side oil chamber to the gas chamber.

6. The marine gas cylinder apparatus according to claim 3, wherein the relief valve is arranged and constructed to double as a temperature compensating relief valve relieving the oil in the piston rod side oil chamber and the piston side oil chamber to the gas chamber.

7. The marine gas cylinder apparatus according to claim 3, wherein the switching valve apparatus is provided with a click ball backed by a click spring in part disposed in a peripheral direction on an end surface opposing to the rotation body of the valve guide, wherein a close position corresponding hole moving the valve guide close to the seat surface and an open position corresponding hole moving the valve guide apart from the seat surface at a time when click balls are engaged therewith, are provided in two positions apart from each other in a peripheral direction on the flat surface of the rotation body.

8. The marine gas cylinder apparatus according to claim 3, wherein the switching valve apparatus is constituted by a three-way valve in which each of the check valves is formed by a poppet valve.

9. The marine gas cylinder apparatus according to claim 8, wherein each of the poppet valves is provided in each of a guide hole arranged in the valve guide so as to be linearly movable, each has a valve body energizable by a valve spring backed up by the rotation body, and each protrudes a seal member provided on an outer end surface of the valve body from the opening edge of the guide hole when the valve body is collided and aligned with an opening edge of the guide hole of the valve guide, the protruding seal member is seated on the corresponding port of the seat surface in a state in which the valve guide exists at a position close to the seat surface.

* * * * *